United States Patent [19]

Melec et al.

[11] Patent Number: 4,833,028
[45] Date of Patent: May 23, 1989

[54] REINFORCED COMPOSITE PRODUCT

[76] Inventors: Didier Melec, 4, Les Landes de Basson Chemin de la Tuilerie, Saint-Aubin-du-Medoc 33160 Saint-Medard-en-Jalles; Claudine You, Cité des Castors La Poueze, 49370 Le Louroux-Beconnais; Geneviève Lefere, 3, Allée de Frescaty, 57158 Montigny-les-Metz; Claudine Peres, 29 avenue du Général Leclerc, 33110 Le Bouscat, all of France

[21] Appl. No.: 933,137

[22] Filed: Nov. 21, 1986

[30] Foreign Application Priority Data

Nov. 22, 1985 [FR] France .................. 85 17423

[51] Int. Cl.$^4$ ........................................... B32B 5/12
[52] U.S. Cl. ..................... 428/36.1; 428/113; 428/240; 428/252; 428/253; 428/283; 428/287; 428/294; 428/906
[58] Field of Search ............... 428/36, 113, 240, 252, 428/253, 283, 287, 294, 906

[56] References Cited

U.S. PATENT DOCUMENTS

| | | | |
|---|---|---|---|
| 2,715,596 | 8/1955 | Hawley | 428/906 |
| 3,391,041 | 7/1968 | Moore | 428/906 |

FOREIGN PATENT DOCUMENTS

| | | |
|---|---|---|
| 0073648 | 8/1982 | European Pat. Off. . |
| 2040805 | 9/1980 | United Kingdom . |

Primary Examiner—Marion C. McCamish

[57] ABSTRACT

The invention concerns a novel composite product based on filament or fiber reinforcements, in particular in the woven or knit form, wound upon itself or in concentric layers.

The object of the invention is a novel composite product characterized in that it comprises a reinforcement or fabric comprising at least one lap wound upon itself or a plurality of tubular laps placed concentrically, and reinforcing filaments or fibers inserted between at least some of the successive layers of the lap or laps, parallel to the axis of the wound or concentric structure and transverse to the latter, the entire assembly being molded into a bonding matrix.

Possible applications are to obtain pieces of high mechanical strength.

7 Claims, 2 Drawing Sheets

REINFORCED COMPOSITE PRODUCT

FIELD OF THE TECHNOLOGY

The present invention concerns a novel composite product based on a reinforcement or fabric of filaments or fibers in wound or concentric layers.

SUMMARY OF THE INVENTION

The object of the invention is a novel composite product comprising: (a) a reinforcement or fabric comprising at least one lap wound upon itself or a plurality of tubular laps formed in a concentric manner; (b) filaments or woven, nonwoven, or knit fibers; and (c) reinforcing filaments or fibers between agt least some of the successive layers of the lap or laps. The reinforcing filaments or fibers are parallel and/or transverse to the axis of the structure. The entire structure may be molded with a bonding matrix to form a rigid or semi-rigid composite of excellent mechanical properties.

The materials and dimensions of the filaments or fibers, the texture of the reinforcement or fabric, and the nature of the resin of the bonding matrix may vary between wide limits. Each is chosen as a function of the applications intended, the morphology of the piece to be made of the material, and the particular forces or stresses that the piece is expected to face.

The product may be molded a block that is more or less rigid depending on the nature of the bonding matrix. The block may be machined by all appropriate means.

The product according to the invention comprises one or several laps of fabric superposed on woven, nonwoven, or knit filaments or fibers. the material of each filament or fiber may vary. Depending on the application, the following may be used: cellulose-based vegetable fibers such as flax or jute; animal fibers such as wool or hair; mineral fibers such as asbestos or alumina; synthetic fibers (polyesters, polyamides, acrylics, and fluorocarbonates are examples); or cellulose derivatives (acetate, rayon, and vicose). So-called "high strength" fibers such as glass fibers, carbon fibers, or aramide fibers may also be employed. Each filament may be homogeneous or heterogeneous, i.e., comprising fibers of different natures.

The filaments or fibers are set in place manually or by machine and may be inserted prior to or during the formation of the lap. Preferably, the reinforcing filaments or fibers are set in place after the winding. The filaments may be stitched and distributed along rectangular or other lines so as to pass through a part or all of the wound mass. The filaments may be distributed in different densities over the structure.

Filaments with different properties (nature of the material, structure, diameter, etc.) may be included in the same lap. Laps superposed on each other may also be of a different nature and properties. In the case of nonwoven laps, the fibers may be monofilament or multifilament. The diameter of the filament and fibers is also variable. The lap or laps may comprise knits of any texture, of variable thickness, or mesh knits which are gathered or straight forward. In the case of a knit lap or laps, the reinforcing filaments or fibers themselves may comprise the mesh of a lap stretched radially by crocheting or needle bonding. In the case of a woven lap, the filaments or fibers are placed in the direction of the weft or chain or in any other direction.

The texture of a knit useful for the inventive structure is formed by an assembly of straight forward meshes comprising a quilt, two cylindrical reverses and a flat weft. This combination is repeated every eight drops. This texture makes possible the use of polyaramide fibers, better known under the tradename of "KEVLAR". Exemplary fibers have metric number 1/56.

It should be understood that the choice of material, the structure and dimensions of the filaments or fibers, and the texture of the lap or of superposed laps are not arbitrary. The selection of each depends on the nature and morphology of the final product in view of the forces and stresses the product is expected to face. The specific combination chosen is left to the judgement of those skilled in the art who are perfectly capable of aligning the structural parameters with the filament or fiber properties that may be used in view of their experience.

The same choice among combinations is true for the resin used as the bonding matrix. The following may be cited as suitable resins: thermosetting resins, in particular phenolic plastics; aminoplastics; epoxies; unsaturated polyesters; cross-linked polyurethanes; alkyds; thermoplastic resins, such as polyvinyls; polyolefins; cellulose; polyamides; special polymers, such as saturated polyesters; linear polyurethanes; or elastomers such as silicone, natural or synethetic rubbers, and their derivatives.

Before applying the resin, the lap or laps are wound helically onto themselves either manually or mechanically. Any number of layers may be formed with a tightness that depends on the ultimate application. The matrix is then molded with the would structure by a number of different methods such as: (a) physical immersion of the structure in the resin; or (b) injection of the resin under pressure into a mold into which the would lap had been previously placed. The mold may be shaped as a function of the final piece to be obtained.

In the case of a lap provided with reinforcing stitches, the assembly may optionally be used "dry", i.e. without the bonding resin.

BRIEF DESCRIPTION OF THE DRAWINGS

Further characteristics, advantages, and objectives of the invention will become apparent from the description of the embodiments presented below, with reference to the drawings. In the drawings.

DETAILED DESCRIPTION OF THE DRAWINGS

Figure 1:
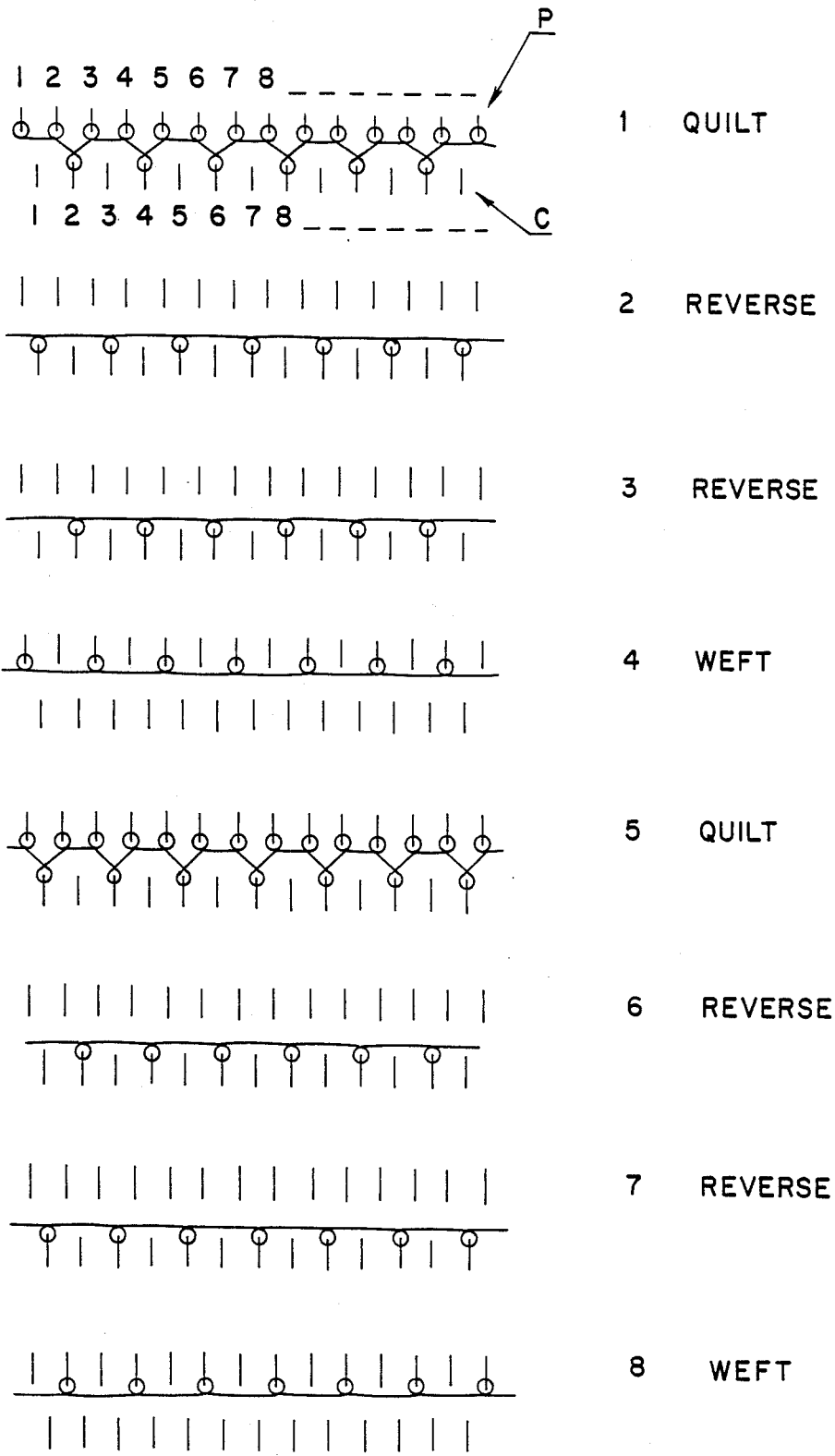
FIG. 1 shows a special knitting texture particularly suitable for preparing structures according to the invention.

FIG. 1 shows a method of obtaining a knit particularly suitable for a product according to the invention and distinguished by its mechanical properties.

In Fig. 1, P and C respectively indicate rows of needles with two knitting heads of a circular knitting frame. The heads shown are one flat and one cylindrical. Eight drops are shown in the figure. The texture depicted is a combination of straight forward meshes repeated every eight drops. This combination is a quilt stitch, two cylindrical reverses, and a flat weft.

Figure 2:
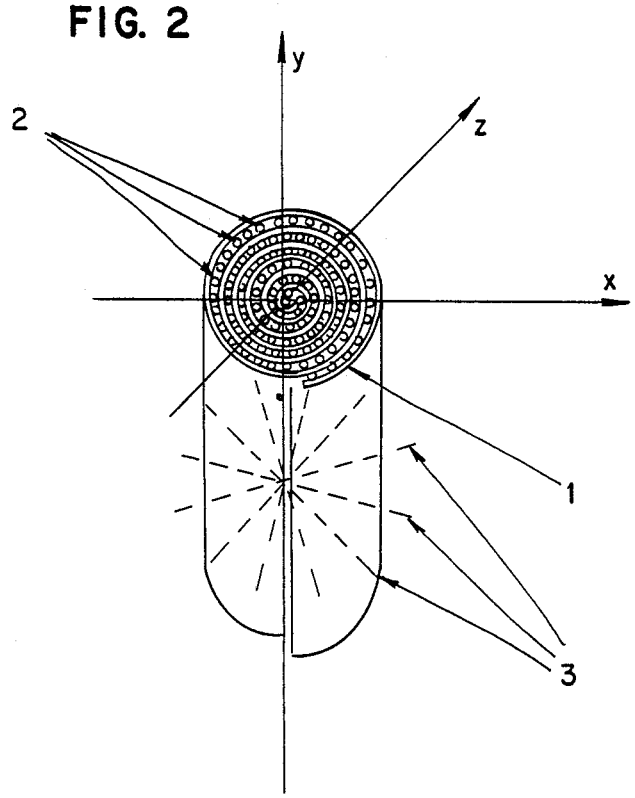
FIG. 2 schematically shows a multidirectional assembly according to the invention.
Figure 3:
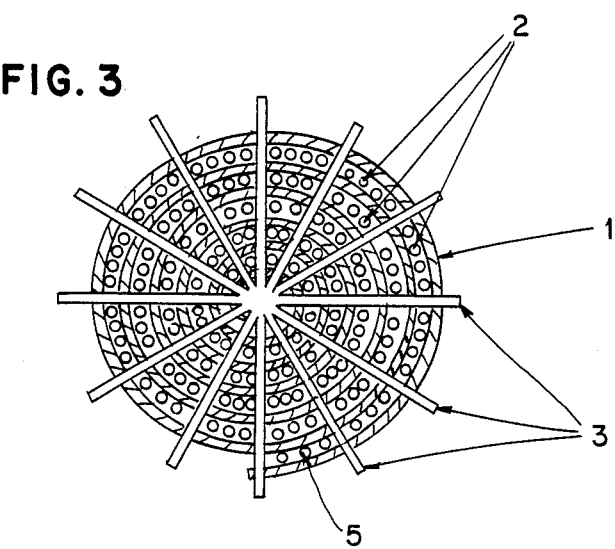
FIG. 3 is a view of a perpendicular section through the y axis of the structure of FIG. 2.

FIGS. 2 and 3 show a composite structure according to the invention comprising lap 1 wound around itself in a helical form, reinforcing filaments or fibers 2 in parallel to the y axis of the winding between different layers of the helical winding, and reinforcing filaments or fibers 3 placed radially in the winding.

The assembly 1, 2, 3 may then be nested in a bonding matrix (not shown). The bonding matrix resin used is chosen to be compatible with the nature of the filaments or fibers of lap 1 and reinforcing filaments or fibers 2, 3. The resin may optionally be reinforced by a powdery or micronized filler as is done at the present time in the technology of composite materials.

The fibers or filaments 2, 3 may be of the same material used for the fibers or filaments of lap 1 depending on the application intended. The filaments 2 may be aramide fibers which are loose or joined together in one or several layers between each layer of the winding. The filaments 3 (also made of aramide fibers, for example) may begin at the y axis and radiate outward in a regular or irregular distribution over a part or the entire thickness of the winding. The distribution of filaments 3 is a function of the desire to have local reinforcements in the wound assembly. Filaments 3 may pass through the assembly diametrically, following a chord, or any other path. The number, nature, disposition and orientation of the filaments or fibers 2 and 3 depend on the need for reinforcing the mechanical properties along any of the x,y, or z axes. As above, the reinforcing is a function of the nature, the morphology, and the destination of the piece or pieces used in the matrix block.

It should also be noted that in the case where the axis of the piece to be machined coincides with the y axis of the winding, a machined piece will be obtained that has isotropic mechanical properties with respect to its axis. Machining may be carried out by any appropriate method. The diameter of the filament and fibers is also variable.

With a composite such as that of FIGS. 2 and 3, a piece is obtained which retains excellent mechanical properties at all points and axes. A cavity formed by defective molding will not introduce a zone of weakness due to the spatial distribution of reinforcing filaments or fibers 2 and 3. The proportion of the filaments or fibers relative to the base lap or laps depends on the strength required of the product in a specific application.

Figure 4:
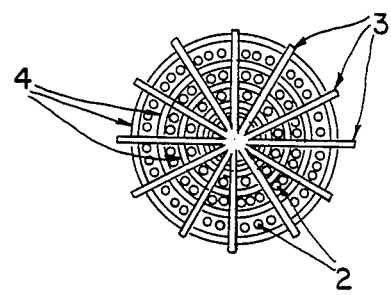
FIG. 4 is a sectional view of a structure according to the invention formed by concentric tubular reinforcements.

FIG. 4 shows another embodiment wherein the single lap or the superposed laps are not wound upon themselves but are replaced by several independent tubular laps 4. These laps are concentric and have reinforcing filaments or fibers distributed as follows: parallel to the axis of the concentric structure (filament 2); between some or several of laps 4; and also radially (filament 3). Laps 4 may or may not be of the same nature or composition.

The assembly of a concentric structure is carried out with knit laps 4 by simultaneously knitting a plurality of fabric laps 4 in parallel around the same axis. Several tubular laps of different diameters will be formed to cover each other concentrically at the outlet of the frame. Reinforcing filaments or fibers 2 are introduced parallel to the axis of the concentric structure in the course of the knitting process.

Finally, the invention is obviously not limited to the embodiments shown and described above.

We claim:

1. A composite product comprising:
    at least one lap of woven, nonwoven, or knitted fabric being formed into a layered structure, said layered structure being formed by: (a) rolling said at least one lap onto itself in a helical winding around an axis, or (b) concentrically forming tubular laps of said fabric around an axis;
    reinforcing filaments or fibers being present in said product: (a) between at least one of said layers and parallel to said axis; (b) transverse to said axis; and/or (c) radial to said axis; and
    a bonding matrix with which said layered structure is molded.

2. A composite product according to claim 1, wherein said reinforcing filaments or fibers are stitched transverse to said axis over at least a part of said layered structure.

3. A composite product according to claim 1, wherein said fabric comprises a knit having a texture formed by the following combination of straight forward stitches: (a) a quilting stitch, (b) two cylindrical reverses, and (c) a flat weft, said combination of stitches being repeated every eight drops.

4. A composite product according to claim 1, wherein said reinforcing filaments or fibers are present in said structure radial to said axis over at least part of said structure.

5. A composite product according to claim 1, wherein said filaments or fibers comprise polyaramide fibers.

6. A composite product according to claim 1, further comprising a powdery or micronized filler in said bonding matrix.

7. A composite product comprising:
    at least one lap of fabric comprising a knit having a texture formed by the following combination of straight forward stitches: (a) a quilting stitch, (b) two cylindrical reverses, and (c) a flat weft, said combination of stitches being repeated every eight drops, the fabric being formed into a layered structure being formed by: (a) rolling said at least one lap onto itself in a helical winding around an axis, or (b) concentrically forming tubular laps of said fabric around an axis;
    reinforcing polyaramide filaments or fibers being present: (a) between at least one of said layers parallel to said axis; (b) transverse to said axis; and/or (c) radial to said axis; and
    a bonding matrix with which said layered structure is molded.

* * * * *

UNITED STATES PATENT AND TRADEMARK OFFICE
CERTIFICATE OF CORRECTION

PATENT NO. : 4,833,028
DATED : May 23, 1989
INVENTOR(S) : Didier Melec, et al

It is certified that error appears in the above-identified patent and that said Letters Patent is hereby corrected as shown below:

On the title page Insert

--(73) Assignee: Societe Civile d'Inventeurs SPML, Le Bouscat, France --.

Signed and Sealed this

Eleventh Day of September, 1990

Attest:

HARRY F. MANBECK, JR.

*Attesting Officer*   *Commissioner of Patents and Trademarks*